W. W. McKESKY.
SIGNAL FOR VEHICLES.
APPLICATION FILED DEC. 2, 1919.
1,390,573.
Patented Sept. 13, 1921.
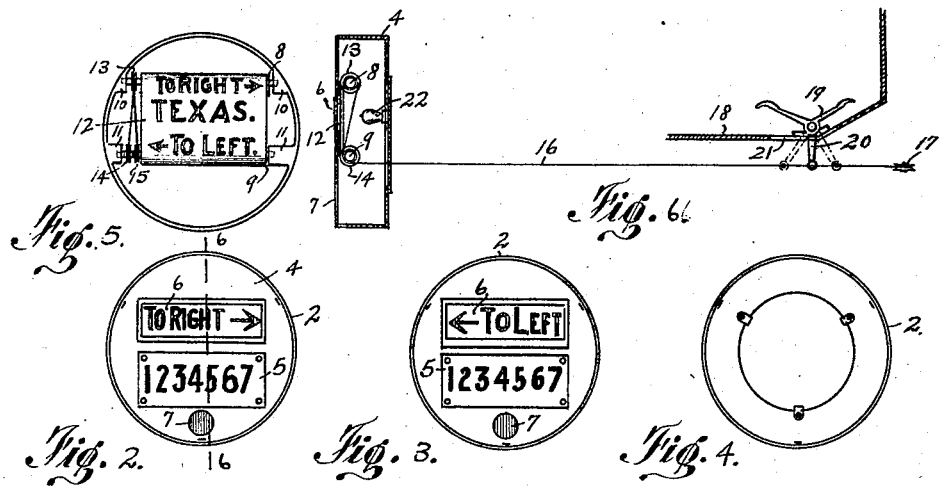
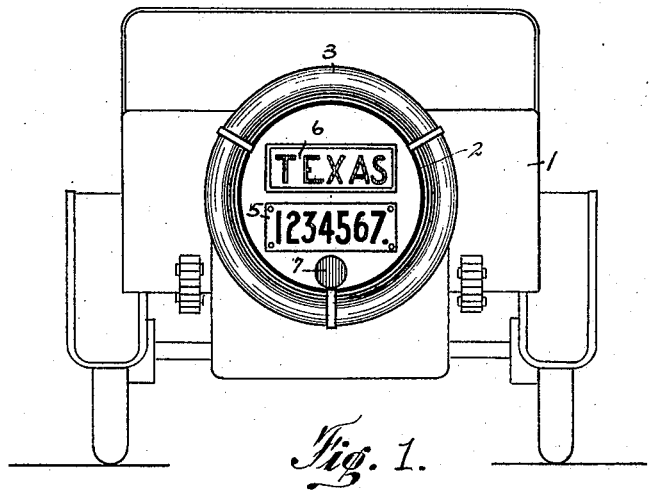
INVENTOR.
Walter W. McKesky
By
Hardway Cathy
ATTORNEYS.

UNITED STATES PATENT OFFICE.

WALTER W. McKESKY, OF HOUSTON, TEXAS.

SIGNAL FOR VEHICLES.

1,390,573.  Specification of Letters Patent.  Patented Sept. 13, 1921.

Application filed December 2, 1919. Serial No. 341,890.

*To all whom it may concern:*

Be it known that I, WALTER W. McKESKY, a citizen of the United States, residing at Houston, in the county of Harris and State of Texas, have invented certain new and useful Improvements in a Signal for Vehicles, of which the following is a specification.

This invention relates to new and useful improvements in a signal for vehicles.

One object of the invention is to provide a signal of the character described, designed to be carried on the rear end of a motor vehicle for the purpose of indicating the movement of said vehicle.

Another object of the invention is to provide a movable signal, which may be readily operated by the driver of the vehicle so as to indicate in advance the direction in which it is intended to turn said vehicle so that those traveling in the rear of the vehicle may know whether the vehicle intends to turn to the right or to the left.

With the above and other objects in view, the invention has particular relation to certain novel features of construction, operation and arrangement of parts, an example of which is given in this specification and illustrated in the accompanying drawings, wherein, Figure 1 shows a rear view of a motor vehicle, with the signal attached thereto.

Figs. 2 and 3 show rear views of the signal in position to indicate the direction in which the vehicle will turn, to wit:— to the right and to the left respectively.

Fig. 4 shows a rear view of the signal,

Fig. 5 shows a front view of the signal with the front wall of the casing removed, Fig. 6 shows a vertical sectional view taken on the line 6, 6 of Fig. 2, showing also the signal operating mechanism.

Referring now more particularly to the drawings the numeral 1 indicates a motor vehicle, secured to the rear end of which is a rim 2, provided for the purpose of carrying an extra tire 3. Within the rim 2 there is a hollow casing 4 preferably formed of sheet metal. The front wall of this casing has a number plate 5 fastened thereto and above this plate there is an oblong translucent pane 6 formed of glass or other similar material and below the number plate, the front wall of the casing has a red glass lens 7.

Within the casing and located above and below the pane 6 are the transverse rotatable rollers 8 and 9, whose respective ends are reduced and have bearings in the respective bearing members 10, 10, and 11, 11, formed within the casing. The numeral 12 designates an endless fabric apron, whose respective ends are wound around the corresponding rollers 8 and 9 and this apron is arranged to travel behind the pane 6 and carries the signs "To right", "To left" and the name of the State in which the vehicle is licensed. One end of the roller 8 carries the fixed pulley 13 and the corresponding end of the roller 9 carries the fixed pulley 14 and the idler pulley 15. Endless cable 16 operates over the pulley 13 and also over the pulleys 14 and 15 and at the front of the vehicle operates over the fixed pulley 17.

Pivoted to the foot board 18 of the vehicle there is a foot pedal 19, which has the depending arm 20 fixed thereto which operates through the slot 21 of said foot board and the free end of the arm 20 is attached to said cable 16. When in neutral position the name of the State as "Texas" is visible through the pane 6, but by a suitable manipulation of the foot pedal 19, the sign "To right", or "To left", may be brought behind said pane so as to be visible.

An electric light 22 is carried by the rear wall of the casing 4 for illumination at night. This electric light casts a red light through the lens 7 thus providing the ordinary tail light for the vehicle and also rendering the signs carried by the apron 12 visible at night.

What I claim is:

A vehicle signal, including a casing, a transparent pane in a wall thereof, rotatable rollers mounted within the casing above and below said pane respectively, a traveling flexible apron mounted on said rollers and arranged to travel behind said pane, a fixed pulley carried by one end of one roller, a fixed and an idler pulley carried by the corresponding end of the other roller, a fixed pulley at the front of the vehicle, an endless cable operating over said pulleys, said idler pulley forming a bearing for the cable, and a foot pedal carried by the vehicle and connected to the cable, through which said cable and said rollers are operated.

In testimony whereof I have signed my name to this specification in the presence of two subscribing witnesses.

WALTER W. McKESKY.

Witnesses:
 JAS. W. OLIVER,
 E. V. HARDWAY.